United States Patent
Mueller et al.

(10) Patent No.: US 12,371,638 B2
(45) Date of Patent: Jul. 29, 2025

(54) CLEANING AGENT, CLEANING METHOD OF WATER TREATMENT APPARATUS, AND CLEANING METHOD OF SILICA-BASED SCALE

(71) Applicant: KURITA WATER INDUSTRIES LTD., Tokyo (JP)

(72) Inventors: Jack Mueller, San Marcos, CA (US); Sara Jaffarian, San Marcos, CA (US)

(73) Assignee: KURITA WATER INDUSTRIES LTD., Tokyo (JP)

(*) Notice: Subject to any disclaimer, the term of this patent is extended or adjusted under 35 U.S.C. 154(b) by 142 days.

(21) Appl. No.: 17/683,374

(22) Filed: Mar. 1, 2022

(65) Prior Publication Data
US 2023/0279313 A1  Sep. 7, 2023

(51) Int. Cl.
| | |
|---|---|
| *B08B 3/08* | (2006.01) |
| *C02F 5/08* | (2023.01) |
| *C11D 3/08* | (2006.01) |
| *C11D 3/33* | (2006.01) |
| *C11D 3/39* | (2006.01) |
| *C11D 7/14* | (2006.01) |

(52) U.S. Cl.
CPC .............. *C11D 3/08* (2013.01); *C02F 5/08* (2013.01); *C11D 3/33* (2013.01); *C11D 3/3902* (2013.01); *C11D 3/3942* (2013.01); *C11D 7/14* (2013.01); *C11D 2111/20* (2024.01)

(58) Field of Classification Search
CPC ........... C11D 3/08; C11D 3/3902; C11D 7/14; B08B 3/022; B08B 3/041; B08B 3/08

USPC .... 510/203, 206, 234, 372, 511; 134/8, 22.1
See application file for complete search history.

(56) References Cited

U.S. PATENT DOCUMENTS

| | | | | | |
|---|---|---|---|---|---|
| 4,540,443 | A | * | 9/1985 | Barber | C23G 1/14 134/41 |
| 4,584,104 | A | * | 4/1986 | Dubin | C02F 5/083 422/18 |
| 4,595,517 | A | * | 6/1986 | Abadi | C23G 1/025 510/253 |
| 5,021,096 | A | * | 6/1991 | Abadi | C02F 5/10 510/253 |

(Continued)

FOREIGN PATENT DOCUMENTS

| | | | |
|---|---|---|---|
| EP | 0126991 | * | 12/1984 |
| JP | S5929093 | | 2/1984 |

(Continued)

OTHER PUBLICATIONS

"International Search Report (Form PCT/ISA/210) of PCT/JP2023/000940," mailed on Mar. 6, 2023, pp. 1-4.

(Continued)

*Primary Examiner* — Gregory R Delcotto
(74) *Attorney, Agent, or Firm* — JCIPRNET

(57) ABSTRACT

The disclosure provides a silica-based scale cleaning technology. The disclosure can provide a cleaning agent of a silica-based scale, containing a silicic acid compound. The disclosure can also provide a cleaning method of a water treatment apparatus, including: using a solution containing a (Continued)

silicic acid compound. Further, the disclosure can provide a cleaning method of a silica-based scale, including: using an agent containing a silicic acid compound for a water system.

10 Claims, 4 Drawing Sheets

(2 of 4 Drawing Sheet(s) Filed in Color)

(56) References Cited

U.S. PATENT DOCUMENTS

| | | | | |
|---|---|---|---|---|
| 5,190,664 A * | 3/1993 | Gallup | ................. | C02F 5/083 |
| | | | | 210/698 |
| 5,685,918 A * | 11/1997 | Tate | ................. | C02F 5/10 |
| | | | | 210/698 |
| 5,858,245 A * | 1/1999 | Gallup | ................. | C02F 5/10 |
| | | | | 210/698 |
| 5,906,971 A * | 5/1999 | Lark | ................. | C02F 5/10 |
| | | | | 210/698 |
| 6,051,142 A * | 4/2000 | Roe | ................. | C02F 5/10 |
| | | | | 210/698 |
| 2012/0000434 A1 * | 1/2012 | Nakajima | ............ | F22B 37/48 |
| | | | | 122/379 |
| 2012/0022192 A1 * | 1/2012 | Nishida | ............ | C02F 5/14 |
| | | | | 524/130 |
| 2018/0015509 A1 | 1/2018 | Carter et al. | | |
| 2021/0130211 A1 * | 5/2021 | Douglas | ............ | C02F 5/02 |

FOREIGN PATENT DOCUMENTS

| | | | | |
|---|---|---|---|---|
| JP | S62247089 | | 10/1987 | |
| JP | H05137918 | | 6/1993 | |
| JP | H08132093 | | 5/1996 | |
| JP | H11189798 | | 7/1999 | |
| JP | 2002155298 | | 5/2002 | |
| JP | 2003041387 | | 2/2003 | |
| WO | 8402126 | | 6/1984 | |
| WO | WO-2013148911 A1 | * | 10/2013 | ........... B01D 61/025 |
| WO | WO-2019046897 A1 | * | 3/2019 | ............. C01F 7/005 |
| WO | WO-2019232011 A1 | * | 12/2019 | ................ C02F 5/10 |
| WO | WO-2019232019 A1 | * | 12/2019 | ................ C02F 5/10 |
| WO | WO2020011764 | * | 1/2020 | |

OTHER PUBLICATIONS

"Written Opinion of the International Searching Authority (Form PCT/ISA/237) of PCT/ JP2023/000940," mailed on Mar. 6, 2023, pp. 1-7.

Dupont, "FilmTec™ Reverse Osmosis Membranes Technical Manual—5.6.6 Plant Performance Normalization," Oct. 2020, pp. 138-142.

* cited by examiner

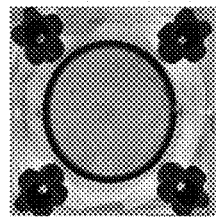 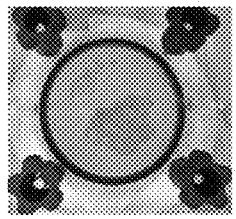 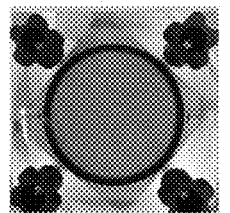 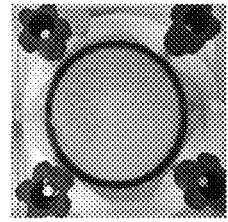
FIG. 3A   FIG. 3B   FIG. 3C   FIG. 3D
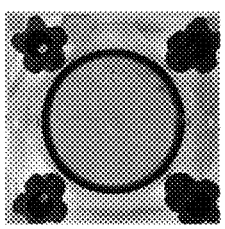 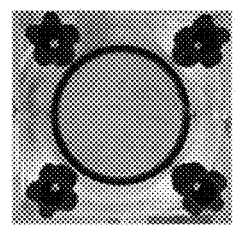 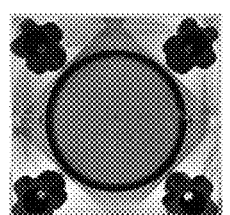 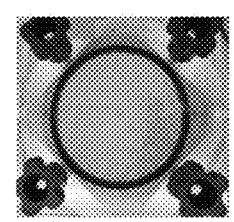
FIG. 3E   FIG. 3F   FIG. 3G   FIG. 3H
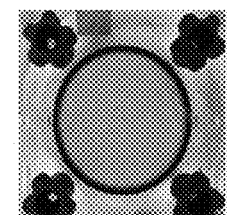 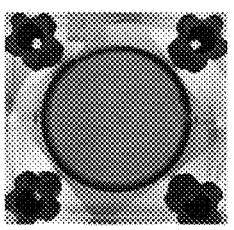 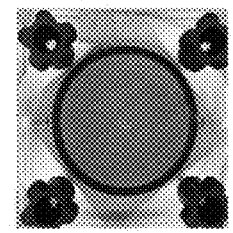
FIG. 3I   FIG. 3J   FIG. 3K
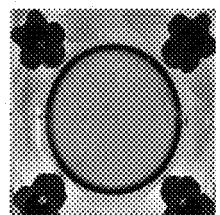 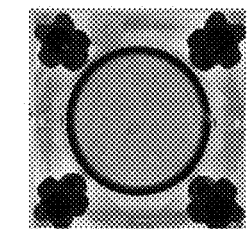 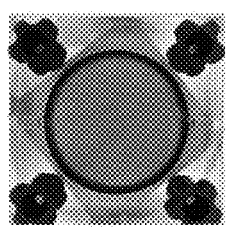 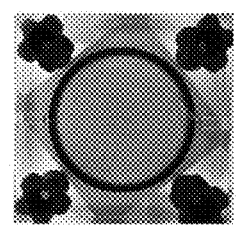
FIG. 3L   FIG. 3M   FIG. 3N   FIG. 3O

CLEANING AGENT, CLEANING METHOD OF WATER TREATMENT APPARATUS, AND CLEANING METHOD OF SILICA-BASED SCALE

BACKGROUND

Technical Field

The disclosure relates to a cleaning agent of a silica-based scale, a cleaning method of a water treatment apparatus, and a cleaning method of a silica-based scale.

DESCRIPTION OF RELATED ART

Conventionally, it is difficult to sufficiently remove silica-containing scale by cleaning with ordinary organic acids, alkalis, or surfactants. Therefore, a cleaning method with hydrofluoric acid or ammonium fluoride, which has a high environmental load and is difficult to handle, a cleaning method with a heated highly alkaline solution, a scraping method with a water-insoluble suspension, and the like is used.

In addition, in order to solve this problem, although a removal of slime and silica mixture deposits has been developed using the synergistic effect of hydrogen peroxide and urea compounds, it cannot be said that the effect thereof is sufficient for scale mainly made up of silica and inorganic substances.

The following Patent Documents 1 to 6 can be mentioned as the related art.

Patent Document 1 (Japanese Patent Laid-Open No. 08-132093) proposes a cleaning agent composition that has an increased removal effect on both slime and scale and is also effective in removing rust, and contains hydrogen peroxide, condensed ammonium phosphate, and a urea compound as active ingredients.

Patent Document 2 (Japanese Patent Laid-Open No. 59-029093) proposes a method for removing scale, including: bringing demineralized water containing 10 ppb or more of dissolved oxygen into contact with silica or organic scale generated on the inner wall surface of a heated water system to which high-purity water having 7 ppb or less of dissolved oxygen is supplied, at 80° C. or higher.

Patent Document 3 (Japanese Patent Laid-Open No. 05-137918) proposes a cleaning solution for a filtration element, in which an organic corrosion inhibitor is added to nitric acid.

Patent Document 4 (Japanese Patent Laid-Open No. 11-189798) proposes an acidic cleaning agent composition that stably supports water system acidification with acidic substances and water-insoluble polishing substances using an anionic surfactant selected from alkyl sulfonate (SAS), alpha olefin sulfonate (AOS), and linear alkylbenzene sulfonate (LAS) as a first component, polyoxyethylene alkanolamide (POE) (2 to 5 mol of EO, or $C_{12}$ to $C_{18}$ of alkyl group) as a second component, and an amine oxide having a specific structure as a third component.

Patent Document 5 (Japanese Patent Laid-Open No. 2003-41387) discloses a method for removing silica-based scale adhering to a metal surface, the method including: (1) cleaning off the scale with a cleaning solution containing fluoride; and then (2) passivating the metal surface with a passivation treatment solution containing fluoride and peroxide, with respect to silica-based scale containing silica and/or silicate adhering to the metal surface.

Patent Document 6 (Japanese Patent Laid-Open No. 62-247089) discloses a scale removing agent that uses a mixture obtained by adding ammonium fluoride or acidic ammonium fluoride into hydrochloric acid for removing silica scale adhering to a bottle washing machine or other iron component materials.

The disclosure provides a silica-based scale cleaning technology.

As a result of diligent studies in view of such circumstances, the inventors have found that silica-based scale can be better cleaned off, reduced, or removed by using a silicic acid compound, and completed the disclosure. The disclosure is as follows.

SUMMARY

The disclosure can provide a cleaning agent of a silica-based scale, containing a silicic acid compound.

The disclosure can provide a cleaning method of a water treatment apparatus, including: using a solution containing a silica-based scale cleaning agent that contains a silicic acid compound, or using a solution containing a silicic acid compound.

The disclosure can provide a cleaning method of a silica-based scale, including: using an agent containing a silicic acid compound for a water system.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 3A to 3O are each photographic image of Samples 1 and 2 (membrane) before and after cleaning in cleaning tests of Disclosures 1 and 2 and the cleaning tests of Conventional Cleaning 1 and 2.

FIG. 3A is a photographic image of Sample 1 (membrane) before cleaning in the cleaning test of Disclosure 1.

FIG. 3B is a photographic image of Sample 1 (membrane) after cleaning in the cleaning test of Disclosure 1.

FIG. 3C is a photographic image of Sample 2 (membrane) before cleaning in the cleaning test of Disclosure 1.

FIG. 3D is a photographic image of Sample 2 (membrane) after cleaning in the cleaning test of Disclosure 1.

FIG. 3E is a photographic image of Sample 1 (membrane) before cleaning in the cleaning test of Disclosure 2.

FIG. 3F is a photographic image of Sample 1 (membrane) after cleaning in the cleaning test of Disclosure 2.

FIG. 3G is a photographic image of Sample 2 (membrane) before cleaning in the cleaning test of Disclosure 2.

FIG. 3H is a photographic image of Sample 2 (membrane) after cleaning in the cleaning test of Disclosure 2.

FIG. 3I is a photographic image of Sample 1 (membrane) after cleaning in the cleaning test of Conventional Cleaning 1.

FIG. 3J is a photographic image of Sample 2 (membrane) before cleaning in the cleaning test of Conventional Cleaning 1.

FIG. 3K is a photographic image of Sample 2 (membrane) after cleaning in the cleaning test of Conventional Cleaning 1.

FIG. 3L is a photographic image of Sample 1 (membrane) before cleaning in the cleaning test of Conventional Cleaning 2.

FIG. 3M is a photographic image of Sample 1 (membrane) after cleaning in the cleaning test of Conventional Cleaning 2.

FIG. 3N is a photographic image of Sample 2 (membrane) before cleaning in the cleaning test of Conventional Cleaning 2.

FIG. 3O is a photographic image of Sample 2 (membrane) after cleaning in the cleaning test of Conventional Cleaning 2.

FIG. 4A is a photographic image illustrating the properties of the residual scale after cleaning Sample 2 in Disclosure 1.

DESCRIPTION OF THE EMBODIMENTS

Figure 1:
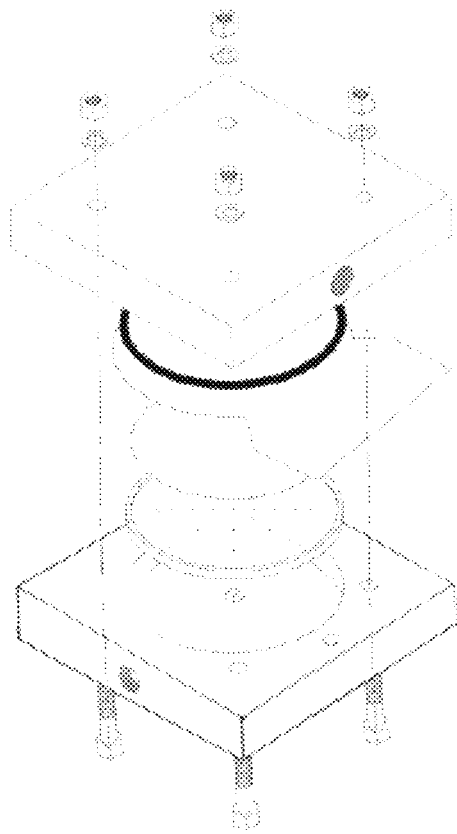
FIG. 1 is a schematic view of an RO flat membrane evaluation cell assembly.

The disclosure can provide a cleaning agent of a silica-based scale, containing a silicic acid compound.

The cleaning agent may be used in a water treatment apparatus or a water system.

In the cleaning agent, the cleaning agent may have a pH of 10 or more, or a water system using the cleaning agent may be adjusted to have a pH of 10 or more.

In the cleaning agent, the cleaning agent may contain the silicic acid compound in an amount of 1,000 to 20,000 mg/L in terms of the total silica content, or the cleaning agent may be used in a water system to obtain a concentration of 1,000 to 20,000 mg/L in terms of the total silica content.

The cleaning agent may further contain one or more selected from a chelating agent, a surfactant, and a dispersant.

The cleaning agent may be a cleaning agent that further contains percarbonate, or a cleaning agent that is used in combination with a solid agent (suitably, powder agent) containing percarbonate.

The disclosure can provide a cleaning method of a water treatment apparatus, including: using a solution containing a silica-based scale cleaning agent that contains a silicic acid compound, or using a solution containing a silicic acid compound.

The solution may be adjusted to have a pH of 10 or more.

The solution may contain the silicic acid compound in an amount of 1,000 to 20,000 mg/L in terms of the total silica content, or the solution may be added to water to be treated in the water treatment apparatus to adjust the water to be treated to have a concentration of 1,000 to 20,000 mg/L in terms of the total silica content.

The solution suitably further contains a solid agent containing percarbonate when used.

The solution may further contain one or more selected from a chelating agent, a surfactant, and a dispersant.

The solution may be used for cleaning the silica-based scale.

The disclosure can provide a cleaning method of a silica-based scale, including: using an agent containing a silicic acid compound for a water system.

The water system may be adjusted to have a pH of 10 or more.

The water system may be water to be treated or circulating water in the water system.

According to the disclosure, it is possible to provide a silica-based scale cleaning technology.

Hereinafter, embodiments for carrying out the present disclosure will be described. In addition, the embodiments described below show an example of a typical embodiment of the disclosure, and accordingly, the scope of the disclosure is not limited nor interpreted by this. Further, the upper limit values and the lower limit values in the numerical values can be combined in any manner, if desired, and "to" in the numerical ranges means "equal to or greater than" and "equal to or less".

1. Regarding Outline of this Technology

In this technology, a main object is to provide a silica-based scale cleaning technology. In this technology, a silica-based scale cleaning technology can be provided by using a silicic acid compound. Since this technology is less affected by corrosion and deterioration of water systems when used, this technology is better for use in water systems or apparatuses provided in water systems.

In the past, in order to obtain a sufficient cleaning effect on scale, it was necessary to use a cleaning solution that had a high environmental load and was difficult to handle, and particularly, it could not be said that the cleaning effect was sufficient especially with respect to scale mainly made up of silica and inorganic substances. On the other hand, in this technology, this object can be achieved by aiming to better clean off, and also reduce the amount of, or remove silica-based scale already existing or being generated in a target.

Further, in the conventional cleaning technology, the influence on corrosion or deterioration of a resin member (of for example, PVDF) and a metal member (of for example, stainless steel such as SUS), which are used for apparatuses provided in a water system and component members (for example, parts, tools, and pipes) of a water treatment apparatus; and a membrane (for example, a resin membrane such as a polyamide membrane or a PVDF membrane) used for membrane treatment, was large. On the other hand, in this technology, this object can be achieved by aiming to better clean off, and also reduce the amount of, or remove silica-based scale already existing or being generated in a target, and by aiming to reduce corrosion or deterioration of the targets or the component members used in the targets.

As a more specific suitable aspect in this technology, it is possible to provide a silica-based scale technology using a solution having a pH of 11.0 to 13.5 at 20° C. or higher and containing a silicic acid compound (suitably, sodium metasilicate or potassium metasilicate), or a silica-based scale technology using a solution adjusted to become such a solution. Furthermore, suitably, one or more selected from a chelating agent, a surfactant, and a dispersant can be used by being incorporated, and/or a percarbonate (suitably, sodium percarbonate) can be contained or used.

Further, the suitable solution in this technology has an advantage that the solution can be easily prepared by dissolving, diluting, or heating a cleaning agent (suitably, a solution or powder) prepared in advance. The suitable cleaning agent according to this technology may contain the silicic acid compound in an amount of 1,000 to 20,000 mg/L (suitably, 3,000 to 10,000 mg/L) in terms of the total silica content. Furthermore, one or more selected from a chelating agent, a surfactant, and a dispersant may be contained in the solution, and/or the percarbonate may be contained in the solution as a solid agent (suitably, a powdered agent), and the agent may be used as a two-dosage form agent kit containing a powdered agent.

Furthermore, in this technology, it is possible to provide a silica-based scale technology in which, by adjusting the total silica content concentration in the target to a predetermined concentration, it is possible to suppress the deterioration of the effect of cleaning or the like on the target due to low concentration, or it is also possible to suppress the occurrence of deposition at the time of pH neutralization during waste liquid treatment due to high concentration.

According to this technology, it is possible to remove scale containing silica, which is mainly made up of inorganic substances. Further, according to this technology, it is possible to provide a silica-based scale technology having less influence on resin members such as a polyamide membrane, a PVDF membrane, and a PVDF resin part, and metal members such as stainless steel (SUS and the like).

In this specification, the "silica-based scale" is a substance formed by combining silica-based substances (for example, polymerized silica, calcium silicate, magnesium silicate, and aluminum silicate) existing in a water system with a base or other components. In general, silica-based scale tends to be deposited in water systems and adhere or accumulate at places which are in contact with water such as water to be treated or circulating water, for example, inside various apparatuses, pipes, flow paths, and membranes (prefilters, MF membranes, UF membranes, reverse osmosis membranes, and the like). With this technology, it is possible to better implement countermeasures against silica-based scale in water systems. Examples of the silica-based scale countermeasures include one or more selected from cleaning off, reduction of amount, or removal of silica-based scale existing in water systems or apparatuses; and suppression, reduction, or prevention of scale generation in water systems or apparatuses.

In this specification, in the measurement method of the "total silica content", the total silica, which is the "total silica" concentration in a solution or a water system, that is, the total silica containing ionic silica (ionic silicic acid), dissolved silica, and colloidal silica, can be measured by the analysis method specified in JIS K 0101 44.3. In the measurement method of the "ionic silica content", the ionic silica, which is the "ionic silica (ionic silicic acid)" concentration in a solution or a water system, can be measured by the analysis method specified in JIS K 0101 44.3.

2. Agent According to Present Embodiment

Description of the agent or the like according to the disclosure, and the description of each configuration or each treatment method, such as the silicic acid compound, the silica-based scale, the pH, the temperature, the total silica content concentration, the dissolved substance concentration, and the used concentration, in "3" and "4" which will be made later which would overlap with the above "1", will be omitted as appropriate. However, the description in "1.", "3.", "4.", and the like are also applied to the present embodiment and can be appropriately adopted. Further, in the description of the method in the present embodiment, the description below can be applied to the present embodiment, and can be appropriately adopted.

The present embodiment can provide a cleaning agent containing a silicic acid compound (hereinafter, also referred to as "the agent of the present embodiment"), suitably a silica-based scale cleaning agent containing a silicic acid compound.

In the present embodiment, it is suitable that the cleaning agent be used in a water treatment apparatus or a water system.

In the present embodiment, it is suitable that the cleaning agent have a pH of 10 or more or a pH of 11 or more, or a water system using the cleaning agent be adjusted to have a pH of 10 or more or a pH of 11 or more.

In the present embodiment, it is suitable that the cleaning agent contain the silicic acid compound in an amount of 1,000 to 20,000 mg/L in terms of the total silica content, or the cleaning agent be used in a water system to obtain a concentration of 1,000 to 20,000 mg/L in terms of the total silica content.

In the present embodiment, it is suitable that the cleaning agent be used at a water temperature of 10 to 70° C. when used.

In the present embodiment, it is suitable that the cleaning agent contain one or more selected from a chelating agent, a surfactant, and a dispersant.

In the present embodiment, it is suitable that the cleaning agent be a cleaning agent further containing percarbonate, or be used in combination with percarbonate when used, and it is suitable that the cleaning agent be stored as a first agent (for example, powder or liquid) containing a silicic acid compound and any appropriate components and a second agent containing percarbonate as a solid (powder and the like).

Further, in the present embodiment, the cleaning agent may be in a unit packaging form. It is suitable that the first agent containing the silicic acid compound and the second agent containing percarbonate be contained as one unit package in the unit packaging form. For example, in a case of a one-dosage form agent including the first agent containing the silicic acid compound and the second agent containing percarbonate, in a state (for example, non-contact state by packaging) where each agent does not directly come into contact with each other, an integrated unit packaging form in which the packages separated from each other are fixed and integrated on or inside one package (sheet, bag, and the like), or one-pack unit packaging form that includes separate agent packages in one package may be adopted, and a unit packaging form with a plurality of agents mixed together may be adopted. For example, when an integrated unit packaging form containing a first agent containing a silicic acid compound and a second agent containing percarbonate is added to water or a treatment target, a part which is divided and packed in the form dissolves in water or the treatment target, each agent therein comes into contact with water or the treatment target and dissolves, and accordingly, the action of each agent is exerted.

The material used for the unit packaging is not particularly limited, and when the material is used by being added to the treatment target or water, a water-soluble resin or a material capable of forming a water-soluble film is suitable. Examples thereof include polyvinyl alcohol, polyvinylpyrrolidone, (vinylpyrrolidone/vinyl acetate) copolymer, methylcellulose, ethylcellulose, hydroxyethylcellulose, hydroxypropylcellulose, hydroxypropylmethylcellulose, carboxymethylcellulose, sodium carboxymethylcellulose, and gum arabic, and one or more of these may be used.

2-1. Silicic Acid Compound

The silicic acid compound used in the present embodiment is not particularly limited, examples thereof include silica (silicic anhydride), silicic acid (for example, orthosilicic acid ($H_4SiO_4$), pyrosilicic acid ($H_6Si_2O_7$), metasilicic acid ($H_2SiO_3$), and metasilicic acid ($H_2Si_2O_5$)), polysilicic acid, and salts thereof, and one or more selected from these can be used. Of these, silicic acid or a salt thereof, or metasilicic acid or a salt thereof is suitable, and when the treatment target is an alkali at the time of use, it is suitable that the silicic acid compound exist in a state of a silicate or a metasilicate, but it is preferable to use a metasilicate when producing the agent. The salt is not particularly limited, and examples thereof include one or more selected from alkali metal salts (for example, sodium salts and potassium salts), alkaline earth metals (for example, magnesium salts and calcium salts) and the like. Of these, alkali metal salts (suitably, sodium salt) are preferable. The sodium salts are also referred to as sodium silicates, and sodium silicate is a compound generally represented by the molecular formula $Na_2O \cdot nSiO_2 \cdot mH_2O$, with the molar ratio at this time not being particularly limited. For example, the molar ratio=weight ratio ($SiO_2\% \cdot Na_2O\ \%) \times (Na_2O$ formula weight/$SiO_2$ formula weight), and n=approximately 0.5 to 4.0.

The form of the silicic acid compound in the agent in the present embodiment is not particularly limited to any of a solid (powder, granule, tablet, and the like), a liquid, a slurry, and the like, but it is preferable that the agent containing the silicic acid compound be in a form that can be prepared and used as a liquid such as an aqueous solution.

In the present embodiment, in a case of a solid agent, although there is no particular limitation, it is preferable that there be 5 to 50%, and more preferably 20 to 40% of the silicic acid compound contained in the agent, in terms of the total silica content. In a case of the liquid agent, the concentration of the silicic acid compound contained in the liquid is not particularly limited, and is suitably approximately 1% to 25%, and more suitably 5 to 20% in terms of the total silica content.

The concentration of the silicic acid compound used in the present embodiment is not particularly limited, and it is suitable that the concentration of the silicic acid compound be adjusted to have a concentration of preferably 1,000 to 20,000 mg/L, and more preferably 3,000 to 10,000 mg/L in terms of the total silica content. When using the silicic acid compound for the treatment target, by adjusting (adding the agent, diluting with water, concentrating, and the like) the concentration to be used, the silica-based scale existing in the treatment target can be cleaned off better. The concentration to be used at this time may be the total silica content concentration in the solution or the water system.

By using the silicic acid compound, countermeasures against silica-based scale can be better implemented. As shown in [Examples] below, it was confirmed that, by using the silicic acid compound, the state of the silica-based scale was clearly altered and the silica-based scale could be easily removed from the adhered part even with a small force applied. The mechanism of action in the present embodiment is still under investigation and has not been clarified. However, the inventors consider that, due to the influence of silica in the silicic acid compound in the solution, not only a silica-based scale that extremely firmly adheres to the water system (for example, membranes and pipes) partially dissolved in the solution containing the silicic acid compound, but also the solution containing the silicic acid compound permeated into this silica-based scale, which softened the extremely firmly adhering silica-based scale, and thus the silica-based scale after treatment with the solution containing the silicic acid compound could be removed even with a small force applied.

The silicic acid compound used in the present embodiment has, for example, a cleaning action, a removing action, or a reducing action with respect to silica-based scale, or an action of preventing scale generation or clogging (for example, clogging of pipes or membranes) caused by silica-based scale. The scale generation or clogging caused by silica-based scale means, for example, fouling (including, for example, facilitating scaling, biofouling, and organic fouling) starting from accumulation or non-removal of silica-based scale.

Therefore, the silicic acid compound can be contained in a cleaning agent, a removing agent, or a reducing agent of silica-based scale, or a silica-based scale generation or clogging preventing agent, or can be used in these agents. In the present embodiment, the silicic acid compound itself can also be used as the agent in the present embodiment, or the silicic acid compound and other components may be used in combination. Otherwise, the silicic acid compound can also be formulated and used at the time of use as a multi-dosage form agent kit made up of the agent containing the silicic acid compound and the agent containing other components. The present embodiment may provide a silicic acid compound to be used for purposes such as cleaning off, removing, or reducing an amount of silica-based scale, or preventing scale generation or clogging caused by silica-based scale, and the use thereof. Further, in the present embodiment, the silicic acid compound can also be used for producing an agent or a preparation such as the above-described silica-based scale cleaning agent. In addition, in the present embodiment, it is also possible to provide a method such as a method for cleaning silica-based scale using a silicic acid compound.

2-2. Optional Components

The agent or composition in the present embodiment may contain various optional components as long as the target technical effect and the effect of the disclosure are not impaired. Examples of suitable optional components used in the present embodiment include pH adjusters and surfactants; anionic surfactants such as alkylbenzene sulfonates; chelating agents such as tripolyphosphates, nitrilotriacetates, ethylenediaminetetraacetates ([4H], [2NA], [3NA], [4NA]), 2-hydroxyethylaminodiacetate, 3-hydroxy-2,2'-iminodisuccinic acid, iminodiacetic acid, and methylglycinediacetic acid; dispersants such as propylene glycol, polyethylene glycol, and polyacrylate; percarbonates; activators such as glucose pentaacetate, acetoxybenzene sulfonate, ethylenediaminetetraacetate; and hydrolases such as proteolytic enzymes, starch degrading enzymes, oil degrading enzymes, and fibrinolytic enzymes; and antiredeposition agents such as polyvinylpyrrolidone, and one or more selected from these can be used. The content mass ratio or the used mass ratio of each component in the agent of the present embodiment is not particularly limited. Further, various components used in the present embodiment can be obtained by a known production method, and commercially available products may be used. The concentration of each component used may be the concentration or content of each component in a solution or a water system. Further, the content mass ratio may be the content ratio in the solution or the water system, and the used mass ratio may be the usage ratio at the time of use in the solution or the water system.

It is suitable that the agent or composition of the present embodiment further contain one or more selected from a chelating agent, a surfactant, and a dispersant, and/or percarbonate. In the present embodiment, the agent or composition containing a plurality of components may be appropriately in the above-described unit packaging form. In addition, when each component is contained in the agent or composition of the present embodiment, the concentration may be adjusted to be approximately 30 to 100 times higher than the concentration of each of the following components used in the agent or composition, and at the time of use, each component may dissolve in the target or water such that the concentration is approximately 1 to 3% in the target or water.

Examples of the chelating agent used in the present embodiment include water-soluble compounds having two or more groups capable of forming a coordinate bond with a metal ion. Of these, ethylenediaminetetraacetates ([4H], [2NA], [3NA], [4NA]) are suitable, and of these, ethylenedinitrilotetraacetic acid 4Na is suitable.

The concentration of the chelating agent used in the present embodiment is not particularly limited, and it is suitable to adjust the chelating agent to have a concentration of preferably 10 to 10,000 mg/L, and more preferably 50 to 1,000 mg/L.

The content mass ratio (used mass ratio) of the chelating agent is preferably 0.05 to 100 parts by mass, and more preferably 0.5 to 35 parts by mass, based on 100 parts by mass in terms of the total silica content, and the "parts by mass" may be "mg/L".

The surfactant used in the present embodiment is not particularly limited, examples thereof include anionic surfactants, cationic surfactants, nonionic surfactants, and amphoteric surfactants, and one or more selected from these can be used. Of these, anionic surfactants and/or nonionic surfactants are suitable, and anionic surfactants are more suitable for cleaning off reverse osmosis membranes.

The concentration of the surfactant used in the present embodiment is not particularly limited, and it is suitable to adjust the surfactant to have a concentration of preferably 10 to 10,000 mg/L, and more preferably 50 to 300 mg/L.

The content mass ratio (used mass ratio) of the surfactant is preferably 0.05 to 1,000 parts by mass, and more preferably 0.5 to 10 parts by mass, based on 100 parts by mass in terms of the total silica content, and the "parts by mass" may be "mg/L".

The dispersant used in the present embodiment is not particularly limited, and examples thereof include polymers such as polymaleic acid, 2-phosphonobutane-1,2,4-tricarboxylic acid (PBTC), bis(poly-2-carboxyethyl)phosphinic acid, 1-hydroxyethylidene-1,1-diphosphonic acid, phosphino carboxylic acid copolymer, acrylamide acrylate copolymer, polyacrylic acid, or salts thereof (for example, alkali metal salts such as sodium). One or more selected from these can be used, and of these, polyacrylic acid or a salt thereof is suitable. The weight average molecular weight of the dispersant polymer is preferably 1,000 to 100,000, and more preferably 4,000 to 20,000, but is not limited thereto. The weight average molecular weight of the polymer can be measured by gel permeation chromatography (GPC) analysis using reference polystyrene as a reference substance.

The concentration of the dispersant used in the present embodiment is not particularly limited, and it is suitable to adjust the dispersant to have a concentration of preferably 10 to 10,000 mg/L, and more preferably 50 to 1,000 mg/L.

The content mass ratio (used mass ratio) of the dispersant is preferably 0.05 to 1,000 parts by mass, and more preferably 0.5 to 100 parts by mass, based on 100 parts by mass in terms of the total silica content, and the "parts by mass" may be "mg/L".

The percarbonate used in the present embodiment is not particularly limited, and examples of the salt include alkali metal salts (Na, K, and the like) and alkaline earth metal salts (Ca, Mg, and the like). Of these, alkali metal percarbonates (Na, K) are suitable, and sodium percarbonate is more suitable. The properties of the peroxide salt may be either liquid or solid (powder, granule, tablet), but when foams are generated in a water system at the time of use, the solid (powder and the like) is suitable. Further, the carbon peroxide salt may be packaged in the above-described water-soluble resin or an agent capable of forming a water-soluble film.

The concentration of the percarbonate used in the present embodiment is not particularly limited, and it is suitable to adjust the percarbonate to have a concentration of preferably 100 to 10,000 mg/L, and more preferably 1,000 to 5,000 mg/L.

The content mass ratio (used mass ratio) of the percarbonate is preferably 0.5 to 1,000 parts by mass, and more preferably 30 to 170 parts by mass, based on 100 parts by mass in terms of the total silica content, and the "parts by mass" may be "mg/L".

In addition, the cleaning agent is suitably used in combination with a solid agent (suitably, a powder agent) containing percarbonate when used. When the percarbonate is used in combination with the silicic acid compound, better silica-based scale countermeasures can be taken. The specific mechanism of action is under intense study, but under high alkaline conditions, when a solution containing a silicic acid compound permeates into the silica-based scale, the percarbonate in the solution decomposes to generate oxygen bubbles, and accordingly, it is considered that the peeling effect on the silica-based scale is synergistically higher.

The form of the agent in the present embodiment is not particularly limited, and may be any of liquid, solid (powder, granule, tablet, and the like), slurry, and the like, and when used, the agent of the present embodiment can be added, dissolved, or diluted in the treatment target (for example, water existing in a water system such as water to be treated or circulating water) or water as a solution used for cleaning. For example, the agent of the present embodiment is added to the water of equipment (pipes, tanks, or the like) provided in the water system to prepare water having a desired total silica content concentration, the prepared water is circulated as the solution in the present embodiment, and accordingly, the inside of the water system may be cleaned.

2-3. Actions and Effects in Present Embodiment

The agent in the present embodiment can clean off the silica-based scale existing or generated in the treatment target. Further, the agent in the present embodiment can also perform removal, reduction, peeling, or adhesion prevention with respect to silica-based scale existing in the treatment target (suitably, water system).

Further, the agent in the present embodiment has an excellent effect that corrosion or deterioration is slow or small (also referred to as low corrosion and low deterioration) with respect to various materials (suitably, metals and/or resins).

In addition, in general, acid treatment using fluorine compounds such as hydrofluoric acid and fluoride is usually performed to dissolve silica, but the acid treatment using fluorine compounds or the like cannot be used because corrosiveness is strong in a case of metal materials such as SUS and deterioration easily occurs in a case of a general simple resin. Compared with the acid treatment using such a fluorine compound, the agent of the present embodiment has an excellent advantage of low corrosion and low deterioration even when used under an alkaline region. Therefore, the agent of the present embodiment can excellently clean off silica-based scale existing in a wide range of treatment targets such as apparatuses or water systems using metals and/or resins as materials. The application of the agent of the present embodiment is suitable with respect to the metals and/or resins, which are used as materials of water systems, water treatment equipment, and apparatuses (for example, pipes of water systems, heat exchangers, refrigerators, air conditioners, and tanks), and the like.

The metal is not particularly limited, and examples thereof include one or more metals selected from iron (carbon steel), stainless steel, and the like. Of these, carbon steel and stainless steel are preferable. As the low corrosiveness of the metal, the corrosion weight loss may be 0.1% or less, 0.5% or less, or 1% or less in the corrosion resistance test in [Examples] which will be described later, and it is suitable to apply the agent of the present embodiment to those using such a metallic material.

The resin is not particularly limited, examples thereof include a chloride resin (polyvinyl chloride resin, polyvinylidene chloride resin, chlorinated polyethylene resin, and the like), polyolefin resin (polyethylene resin, polypropylene resin, polyvinylidene fluoride resin, and the like), and (meth) acrylic resin (for example, polyacrylic acid ester resin, polymethacrylic acid ester resin, polyacrylamide resin, polyacrylic nitrile resin, and the like), and one or more resins selected from these can be used. Of these, a chloride resin such as polyvinyl chloride and polyvinylidene chloride; a polyolefin resin such as polyethylene and polypropylene; and a (meth)acrylic resin such as a polyacrylic acid ester are preferable. As the low deterioration of the resin, the resin volume loss may be 0.1% or less, 0.5% or less, or 1% or less in the corrosion resistance test in [Examples] which will be described later, and it is suitable to apply the agent of the present embodiment to those using such a resin material.

The agent in the present embodiment can be used in a water system in which a silica-based scale is present, regardless of water quality conditions and operating conditions.

The water system that can be applied to the present embodiment is not particularly limited, and examples thereof include a water treatment system such as a system having various processes for water treatment and a membrane treatment system; a circulating water system (cooling water system, boiler system) including a cooling tower, a boiler, and the like; and a circulating water system such as a pulp process water system for pulp and paper production and a process water system such as a scrubber water system, and can be applied to one or more selected from these.

In a water treatment system or the like, the agent can be added to water to be treated or the like to be used, and it is suitable to add the agent immediately before the membrane treatment or between the membrane treatment and the treatment before the membrane treatment. In a circulating water system or the like, the agent can be added to circulating water or make-up water to be used.

The place and method for adding the agent in the present embodiment are not particularly limited, and the agent can be added at any place as an aqueous solution prepared to any concentration in the water system to be used.

Further, in the present embodiment, it is possible to apply the agent to the circulating water system or the like of a building air conditioner or a heat exchanger of general factories or petroagent complexes, and it is also possible to perform removal, reduction, peeling, or adhesion prevention with respect to silica-based scale in apparatuses (for example, a heat exchanger main body, a circulating water pit, and a cooling tower) or in pipes.

3.3. Cleaning Method According to Disclosure

In the description of the cleaning method or the like according to the disclosure, the description of each configuration or each treatment method, such as the silicic acid compound, the silica-based scale, the pH, the temperature, the total silica content concentration, the dissolved substance concentration, or the used concentration, in the above-described "1." and "2." and "4." which will be described later, will be omitted as appropriate. However, the description in "1.", "2.", "4.", and the like are also applied to the present embodiment and can be appropriately adopted. Further, in the description of the method in the present embodiment, the description which will be described later can be applied to the present embodiment, and can be appropriately adopted. Further, in the present embodiment, for example, "doing" such as "cleaning the water system" may be referred to as "process" or "step", "step" may be referred to as "doing" or "process", and "process" may be referred to as "doing" or "step". Further, in the present embodiment, the "mechanism" and "means" may be referred to as a system, an apparatus, or a part, the "apparatus" may be referred to as a system, a mechanism, or a part, and the "part" may be referred to as a part or an apparatus included in a mechanism, an apparatus, or a system.

The present embodiment can provide a cleaning method of a water treatment apparatus or a cleaning method of a silica-based scale using a silicic acid compound, a solution containing a silicic acid compound, or an agent of the present embodiment. The solution containing the silicic acid compound may be a solution containing the agent (for example, a silica-based scale cleaning agent containing a silicic acid compound) of the present embodiment. Hereinafter, the description will be given with "a solution containing a silicic acid compound", but in the present embodiment, "a solution containing a silica-based scale cleaning agent containing a silicic acid compound" may be given.

The present embodiment may be a method for cleaning a water system, a method for removing, reducing an amount of, or peeling off silica-based scale in the water system, or a method for preventing scale generation or clogging caused by silica-based scale.

The pH of the solution containing the silicic acid compound used in the present embodiment is suitably in the alkaline region, is preferably 10 or more, more preferably 11 or more, and still more preferably 11.5 or more as a suitable lower limit value, is preferably 14 or less, 13.5 or less as a suitable upper limit value, and is preferably 11 to 14 as the suitable numerical range. Then, in the present embodiment, it is suitable to adjust a solution containing a silicic acid compound to have such a pH, and the pH of the solution (for example, a water system and a cleaning solution) when the solution is brought into contact with a treatment target (for example, an apparatus, a pipe, and a membrane) such as a cleaning target is suitable.

The water temperature of the solution containing the silicic acid compound is not particularly limited, and is preferably 10° C. or higher, more preferably 20° C. or higher, and still more preferably 30° C. or higher as a preferable lower limit value, is preferably 70° C. or lower, more preferably 60° C. or lower, and still more preferably 50° C. or lower as a suitable upper limit value, and is 30 to 50° C. as the suitable numerical range. In the present embodiment, it is suitable to adjust the solution containing the silicic acid compound to have such a water temperature, and the water temperature of the solution when the solution is brought into contact with the treatment target such as a cleaning target is suitable.

The solution containing the silicic acid compound is preferably 100 mg/L or more, more preferably 500 mg/L or more, still more preferably 800 mg/L or more, more preferably 1,000 mg/L or more, more preferably 1,500 mg/L or more, more preferably 2,000 mg/L or more, still more preferably 2,500 mg/L or more, and still more preferably 3,000 mg/L or more as a suitable lower limit value, is preferably 50,000 mg/L or less, more preferably 40,000 mg/L or less, still more preferably 30,000 mg/L or less, more preferably 20,000 mg/L or less, and more preferably 10,000 mg/L or less as a suitable upper limit value, and is preferably 1,000 to 20,000 mg/L, and more preferably 3,000 to 10,000 mg/L as the suitable numerical range, in terms of the total silica content in the solution. In addition, in the present embodiment, it is suitable to adjust the solution used in the present embodiment by adding or mixing the solution with a silicic acid compound to obtain such a solution concentration in terms of the total silica content. The total silica concentration content of the solution (for example, a water system and a cleaning solution) when the solution is brought into contact with a treatment target (for example, an apparatus, a pipe, and a membrane) such as a cleaning target, is suitable.

It is suitable that the solution containing the silicic acid compound further contain a solid agent containing percarbonate when used by adding, incorporating, or mixing the solid agent.

It is suitable that the solution containing the silicic acid compound further contain one or more selected from a chelating agent, a surfactant, and a dispersant. In addition, the agent may be added as a one-dosage form agent or may be added as a multi-dosage form agent kit such as a two-dosage form agent made up of a plurality of agent products. Furthermore, it is more suitable to further add the second agent containing any component (suitably, percarbonate) to the water system at the same time as or at a different time from the addition of the first agent containing the silicic acid compound. Further, in a case of a one-dosage form, a unit packaging form may be adopted, and in a case of a multi-dosage form, each agent may be film-coated with the above-described water-soluble resin or water-soluble film forming agent and dissolved by coming into contact with water at the time of use.

The solution containing the silicic acid compound is suitably a silica-based scale cleaning solution, and for example, is suitably a cleaning solution for performing cleaning-off, reduction, removal, or scale prevention with respect to a part (for example, inside the apparatus, parts, pipes, and membranes) where water (for example, water to be treated, cooling water, and circulating water) in the water system or the water treatment apparatus, flows.

The concentration of the chelating agent used in the solution containing the silicic acid compound is not particularly limited, is preferably 10 mg/L or more, more preferably 30 mg/L or more, and still more preferably 50 mg/L or more as a more suitable lower limit value, and is preferably 10,000 mg/L or less, more preferably 5,000 mg/L or less, still more preferably 3,000 mg/L or less, and more preferably 1,000 mg/L as a more suitable upper limit value.

The concentration of the surfactant used in the solution containing the silicic acid compound is not particularly limited, is preferably 10 mg/L or more, more preferably 25 mg/L or more, and still more preferably 50 mg/L or more as a more suitable lower limit value, and is preferably 10,000 mg/L or less, more preferably 800 mg/L or less, still more preferably 500 mg/L or less, and more preferably 300 mg/L as a more suitable upper limit value.

The concentration of the dispersant used in the solution containing the silicic acid compound is not particularly limited, is preferably 10 mg/L or more, more preferably 20 mg/L or more, more preferably 30 mg/L or more, more preferably 40 mg/L or more, and still more preferably 50 mg/L or more as a more suitable lower limit value, and is preferably 10,000 mg/L or less, more preferably 5,000 mg/L or less, still more preferably 3,000 mg/L or less, and more preferably 1,000 mg/L as a more suitable upper limit value.

The concentration of the percarbonate used in the solution containing the silicic acid compound is not particularly limited, is preferably 100 mg/L or more, more preferably 500 mg/L or more, still more preferably 800 mg/L or more, and more preferably 1,000 mg/L or more as a more suitable lower limit value, and is preferably 10,000 mg/L or less, more preferably 8,000 mg/L or less, still more preferably 7,000 mg/L or less, and more preferably 5,000 mg/L as a more suitable upper limit value.

The solution containing the silicic acid compound in the present embodiment can be continuously or intermittently in contact (fluid flow, injection, convection, immersion, and the like) with the treatment target containing the silica-based scale. Further, in the present embodiment, a mechanism configured to change the flow rate or the flow speed of the solution containing the silicic acid compound may be provided, and accordingly, the flow rate or the like of the solution containing the silicic acid compound may be changed. As the change of the flow rate or the like, for example, the adjustment of the strong period and the weak period of the flow rate of the flow or the like, and the adjustment of the ON period and the OFF period of the flow or the like are suitable. Here, "strong (many)" and "weak (low)" refer to a relative relationship, and for example, a certain flow rate may be stronger (more) or weaker (less) than a certain flow rate. "Certain" may be a case before and after the passage of time (for example, the flow rate after the passage of time is stronger (more) or weaker (less) than the flow rate before the passage of time). Further, the OFF period may be a period during which the operation of the fluid such as flow, injection, and convection is OFF. For example, even during the OFF period, when the solution containing the silicic acid compound is in contact with the treatment target, the OFF period may be used as the immersion period.

In the present embodiment, the flow rate of the solution containing the silicic acid compound is not particularly limited, and can be appropriately set depending on the scale of the water system, the type of the water system, the type of the provided apparatus, and the like.

In the present embodiment, the period during which the solution containing the silicic acid compound is in contact with or exists in the treatment target containing the silica-based scale is not particularly limited. Regarding the contact period, a longer time (hours) or days (days) are more suitable from the viewpoint of reducing silica-based scale. The contact period is preferably 1 hour or longer, more preferably 2 hours or longer, and still more preferably 3 hours or longer as a suitable lower limit value. The contact period is preferably 2 days or shorter, more preferably 24 hours or shorter, still more preferably 18 hours or shorter, and more preferably 12 hours or shorter as a suitable upper limit value from the viewpoint of work man-hours or resumption.

This contact period is preferably accompanied by fluid flow or fluid circulation. For example, by adjusting the flow rate or the like with a control mechanism such as a pump or a regulating valve, the flow is turned on or off or adjusted to be stronger or weaker, and accordingly, the silica-based scale can be peeled off more easily. The ON period and OFF period of the fluid flow are preferably 0.5 to 12 hours, more preferably 1 to 8 hours, and still more preferably 2 to 6 hours as a suitable ON period, and are preferably 1 to 18 hours, more preferably 4 to 15 hours, and still more preferably 8 to 12 hours as a suitable OFF period. For example, a flow (flow ON period) of 0.5 to 12 hours is performed, and immersion (flow OFF period) is performed for 5 to 18 hours after the flow is stopped. By the immersion, the silicic acid compound permeates into the silica-based scale, and thus the silica-based scale adhering at the time of the flow at the resumption is easily peeled off or dissolved.

The treatment target of the present embodiment is not particularly limited, and a water system is suitable, a water treatment apparatus or a water treatment system is more suitable, and a water treatment apparatus provided with a membrane treatment apparatus is more suitable. Further, in order to carry out the present embodiment, it is suitable to provide a mechanism for cleaning the treatment target (for example, a separation membrane and a pipe) such that the fluid of the agent or solution of the present embodiment flows through the treatment target. More suitably, a fluid circulation path and a fluid control mechanism (for example, a pump and a flow rate control valve) are provided such that the fluid of the agent or the solution of the present embodiment can circulate while being in contact with the treatment target. As a fluid contact mechanism with such a treatment target, equipment or mechanism existing or provided in the water system may be used.

The water treatment apparatus which is a treatment target of the present embodiment is not particularly limited, and for example, a water treatment apparatus provided with a separation membrane for treating the water to be treated is suitable. Of these, it is suitable to consider a separation membrane on which silica-based scale easily adheres or accumulates as a treatment target.

The separation membrane which is a treatment target is not particularly limited, examples thereof include an ultrafiltration membrane (UF membrane), a microfiltration membrane (MF membrane), a nanofiltration membrane (NF membrane), and a reverse osmosis membrane (RO membrane), and one or more selected from these can be used. Of these, the reverse osmosis membrane is suitable because the agent containing the silicic acid compound has a good cleaning action and a low deterioration action.

Examples of the separation membrane include a membrane made up of organic material (for example, polyvinylidene fluoride (PVDF), polyethylene (PE), polytetrafluoroethylene (PTFE), polypropylene (PP), cellulose acetate (CA), polyacrylonitrile (PAN), polyimide (PI), polysulfone (PS), and polyethersulfone (PES)) or the resin; and a membrane made up of inorganic material (for example, aluminum oxide (alumina: $Al_2O_3$), zirconium oxide (zirconia: $ZrO_2$), titanium oxide (titania: $TiO_2$), and stainless steel (SUS)) or the metal.

In addition, the reverse osmosis membrane (RO membrane) is not particularly limited, and examples thereof include a membrane having a spiral shape, hollow thread shape, or flat film shape, in which the skin layer is made up of resin such as cellulose acetate, aromatic polyamide, or aromatic polyimide.

The water to be treated used in the present embodiment is not particularly limited, and examples thereof include seawater, river water, well water, lake water, industrial water, city water, wastewater, and wastewater treated water. One or more selected from these can be used, and the water to be treated may contain organic substances. In the present embodiment, the water to be treated can also be applied to industrial wastewater treatment and a system for obtaining treated water (for example, reclaimed water, pure water, and ultrapure water) from which unnecessary substances such as organic compounds have been removed. Further, the present embodiment can also be applied to a system for obtaining treated water (for example, drinking water, pure water, and ultrapure water) from which salt has been removed by applying the water to be treated to seawater desalination, and the like, and the water to be treated at this time may contain salt.

As a water treatment system to which the present embodiment can be applied, it is suitable to include at least a membrane separation process for performing membrane separation treatment with respect to the water to be treated, and as the membrane separation process, it is suitable to include a prefilter treatment process and/or a reverse osmosis membrane treatment process.

For the water treatment system, one or more selected from an activated carbon treatment process (component activated carbon treatment process) in which the water to be treated (raw water) is treated with activated carbon, a coagulation treatment process in which a coagulant is added to the water to be treated (raw water) by the coagulating apparatus, a solid-liquid separation process in which coagulation-treated water is treated by a solid-liquid separation apparatus, and various agent addition process may further be included. Further, as the water treatment system, water is passed through an activated carbon tower (biologically activated carbon tower) into which raw water flows, a reaction tank, a relay tank, a filter, and an RO apparatus to obtain treated water. The concentrated water is discharged out of the water system by the concentrated water discharge line. A bypass pipe may be provided in order to introduce the runoff water of the activated carbon tower into the RO apparatus (in this example, the front stage side of the filter 4).

In the cleaning method of a water treatment system having a membrane separation of the present embodiment, it is suitable that the agent of the present embodiment be added before the prefilter treatment process and/or before the RO membrane treatment process, or between the prefilter treatment process and the RO membrane treatment process (or before the RO membrane treatment), or it is suitable to circulate the prefilter treatment process and/or the RO membrane treatment process.

Further, examples of the circulating water system to which the present embodiment can be applied include abatement scrubber equipment configured to perform adsorption, washing with water, neutralization of agent with respect to gas containing harmful substances to be generated and release the gas to the atmosphere, and a humidity regulator for air conditioning. Further, it is suitable that the cleaning method of the circulating water system of the present embodiment have at least a process of adding the agent to the circulating water system and bringing the agent into contact with the treatment target. In addition, the place where the agent is added is not particularly limited, and is suitably make-up water supply means, agent injection means, a circulating water channel, a transfer pump, or the like, and the agent can be added at one or more places selected from these.

In addition, the circulating cooling water system among the circulating systems to which the present embodiment can be applied is not particularly limited, and may be either an open circulating cooling water system or a closed circulating cooling water system. It is suitable that the open circulating cooling water system be configured such that the cooling water can circulate in an open type, and it is suitable that the closed circulating cooling water system be configured such that the cooling water can circulate in a closed type.

Further, it is suitable that the cleaning method of the cooling water system of the present embodiment have at least a process of adding the agent to the cooling water system and bringing the agent into contact with the treatment target. Further, the place where the agent is added is not particularly limited, and may be any place in the cooling water system. Examples thereof include blower means, sprinkler means, pit, make-up water supply means, agent injection means, circulating water channel, transfer pump, and heat exchanger, and make-up water supply means, agent injection means, circulation water channel, and transfer pump are suitable. The agent can be added at one or more places selected from these. 4. Cleaning method of silica-based scale according to disclosure In the description of the cleaning method or the like according to the disclosure, the description of each configuration or each treatment method, such as the silicic acid compound, the silica-based scale, the pH, the temperature, the total silica content concentration, the dissolved substance concentration, or the used concentration, in the above-described "1.", "2.", and "3.", will be omitted as appropriate. However, the description in "1.", "2.", "3.", and the like are also applied to the present embodiment and can be appropriately adopted. Further, in the description of the method in the present embodiment, the description which will be described later can be applied to the present embodiment, and can be appropriately adopted.

The present embodiment can provide a cleaning method of a water treatment apparatus, including: using an agent containing a silicic acid compound for a water system.

It is suitable to adjust the water system to have a pH of 10 or more.

The water system is suitably water to be treated or circulating water, and more suitably, water to be treated in a water treatment system (more suitably, a membrane treatment system or the like) or circulating water in a circulating water system (more suitably, a cooling water system or a boiler water system including a heat exchanger, a scrubber water system, and the like).

The concentration of the silicic acid compound used in the present embodiment is not particularly limited, and it is suitable to use the silicic acid compound in a water system to obtain a concentration of 1,000 to 20,000 mg/L in terms of the total silica content.

The present embodiment can provide a cleaning method of a silica-based scale in a water system, including a process of adding an agent containing a silicic acid compound to the water system such that the water system has a predetermined total silica content concentration. Furthermore, after the addition, it is suitable to include a cleaning process of performing cleaning by circulating the fluid (liquid) of the water system until the total silica content concentration in the water system increases, and then the total silica content concentration is leveled off at a constant concentration, or until reaching the total silica content concentration of the set upper limit. In the agent addition process, when the total silica content concentration of the water system containing the silicic acid compound is high, water dilution and additional agent addition may be used in combination so as to have a predetermined concentration. When the total silica content concentration in the water system is leveled off, an additional addition process of further adding the agent of the present embodiment may be included. Further, when the total silica content concentration in the water system increases only by an increase amount of the total silica content concentration due to the additionally added agent, the cleaning may be finished. Further, a discharge process of discharging a part or all of the water system or the solution containing dissolved or peeled silica-based scale to the outside of the system may be included during the cleaning or after the cleaning is finished. The discharge process is suitable from the viewpoint of cleaning efficiency because the discharge of a part or all of the water system is performed based on the measurement result of the water system. As the measurement result of the water system, for example, one or more selected from the total silica content concentration, the pH, the dissolved substance concentration, and the like can be used. Further, the discharge process may be a liquid exchange process, and as the liquid exchange process, for example, replenishment of the cleaning solution to the water system, addition of the agent, or the like may be carried out to exchange the liquid in the water system.

Further, the present embodiment can provide a silica-based scale cleaning method or a cleaning method of a silica-based scale in a water system, or a managing method of a silica-based scale, the method including an adjustment process of adjusting the water system to have a predetermined total silica content concentration by adding the agent to the water system. By adding the agent to the water system and/or diluting with water, it is possible to prepare a cleaning water (cleaning solution) of a water system having a predetermined total silica content concentration. By executing the adjustment process over time, silica-based scale existing in membranes, pipes, and the like of the water system can be dissolved or peeled off in cleaning water of the water system. During or after the cleaning, a part or all of the cleaning water or solution of the water system containing silica-based scale may be discharged to the outside of the water system. In this manner, the silica-based scale existing in the water system can be cleaned off, removed, reduced, suppressed, or prevented from being generated.

Further, it is suitable that the present embodiment include a measurement process of measuring the total silica content concentration in the water system and/or an addition process of adding the agent to the water system. Furthermore, it is suitable to include a pH measurement process of measuring the pH in the water system. The total silica content concentration may be an ionic silica content concentration. The total silica content concentration measuring apparatus is not particularly limited. A configuration in which ionic silica (mg/L) and/or total silica (mg/L) can be measured is suitable, and a measuring apparatus capable of measuring the total silica is more suitable. Further, the pH measuring apparatus is not particularly limited, but is suitably configured such that the pH in the water system can be measured. In addition, the present embodiment may appropriately include a process of measuring the electric conductivity in the water system and/or a process of measuring the BRIX in the water system, and the measurement can be performed with an electric conductivity meter, a BRIX meter, or the like, respectively. Accordingly, it is also possible to measure the concentration or the like of the dissolved substance. Further, the present embodiment may include a process of measuring the dissolved substance concentration in the water system.

In addition, the agent addition apparatus is not particularly limited, a single or a plurality of agent addition apparatuses may be provided in the water system, and it is suitable that the agent addition apparatus be configured such that an agent such as a silicic acid compound or a pH adjuster can be added to the water system. Further, the present embodiment may be carried out, in the water system, with the apparatus configured such that a flow (flow rate and the like), immersion, injection, and the like can be performed with respect to a target of a part (for example, a membrane, a tool, and a pipe) to which silica-based scale is adhered.

In the present embodiment, based on the measurement result of the measurement process, the amount of the agent added (or the amount used) or the dilution amount of water (or the amount used) with respect to the water system in the addition process can be adjusted to obtain a predetermined total silica content concentration. Further, in the addition process, a pH adjuster can be added to the water system to adjust to have a predetermined pH. It is suitable that these measuring apparatuses and agent addition apparatuses be managed and controlled by a control apparatus (or control part) provided in the apparatus or system of the present embodiment, these apparatuses can send and receive various data between each apparatuses as appropriate, and it is suitable that the control apparatus adjust the total silica content concentration, the pH, the agent use, and the like for the water system based on these various data.

Examples of the cleaning method in the present embodiment will be described below, but the disclosure is not limited thereto. The control part used in the present embodiment is configured to execute the method in the present embodiment, and instead of the control part, an operator (human) may appropriately execute the method in the present embodiment. The use of the agent includes a used concentration, a contact time (use time), a contact temperature, a flow, and the like, and may be appropriately selected from these. The control mechanism can execute such increase and decrease adjustments to perform feedback control.

Example 1 of the present embodiment will be described below. Examples 2 to 5 below can be adopted or integrated as appropriate.

As step 101, the control part performs adjustment by adding a silicic acid compound or water such that the cleaning solution has a predetermined total silica content concentration. In addition, in step 101, the control part may perform adjustment to obtain a predetermined total silica content concentration based on the measurement result of the total silica content concentration, and further, may instruct a measurement part to measure the total silica content concentration and transmit the measurement result to the control part. Further, the control part may adjust the cleaning solution by appropriately adding any component or the like.

As step 102, the control part brings the cleaning solution into contact with the treatment target for a predetermined period, and then finishes the cleaning.

Example 2 of the present embodiment will be described below. It is suitable that Example 1 further include a step of pH measurement and pH adjustment. Examples 1, and 3 to described above and below can be adopted or integrated as appropriate. In the following, the step of adjusting the total silica content concentration and the pH adjustment step may be carried out at the same time or by changing the order of the steps.

As step 201, the control part performs adjustment by adding a silicic acid compound or water such that the cleaning solution has a predetermined total silica content concentration.

As step 202, the control part performs adjustment by adding the pH adjuster (acid or alkali) such that the cleaning solution has a predetermined pH. In addition, in step 202, the control part may perform adjustment to have a predetermined pH based on the pH measurement result, or may instruct the measurement part to measure the pH and transmit the measurement result to the control part.

As step 203, the control part brings the cleaning solution into contact with the treatment target for a predetermined period, and then finishes the cleaning.

Example 3 of the present embodiment will be described below. Examples 1, 2, 4 and described above and below can be adopted or integrated as appropriate. The control part may integrate and perform step 201 and/or step 202 of Example 2 before and after step 301.

As step 301, based on the result of pH measurement, when the cleaning solution drops below a predetermined pH from the alkaline region, the control part discharges a part or all of the cleaning solution out of the system by replacing or changing the cleaning solution with a new cleaning solution. Then, the control part prepares a new cleaning solution by adding a silicic acid compound, a pH adjuster, the agent of the present embodiment, and the like to the cleaning solution in the system after the discharge.

As step 303, the control part brings the cleaning solution into contact with the treatment target for a predetermined period, and then finishes the cleaning.

Example 4 of the present embodiment will be described below. Examples 1 to 3 described above and Example 5 below can be adopted or integrated as appropriate.

As step 401, the control part performs adjustment by adding the pH adjuster (acid or alkali) such that the cleaning solution has a predetermined pH. Step 401 may be skipped.

As step 402, the control part causes the measuring apparatus to measure the total silica content concentration in water (for example, a water system) to which the silicic acid compound is added.

As step 403, the control part adds the agent of the present embodiment or water to the cleaning solution such that the measurement result of the total silica content concentration is a set predetermined total silica content concentration in the cleaning solution, and is executed to start the cleaning by the fluid flow or the like. The set predetermined total silica content concentration in the cleaning solution may be data stored in advance and acquired by accessing.

As step 404, the control part obtains the current total silica content concentration data by monitoring the total silica content concentration in the cleaning solution during cleaning with a measuring apparatus, compares the current total silica content concentration data with the total silica content concentration of the previous measurement, and determines the change (increased or maintained state) of the total silica content concentration in the cleaning solution. It is suitable that the various acquired data be stored in a storage part.

As step 405, when the total silica content concentration is higher than the total silica content concentration of the previous measurement after step 404, the control part executes monitoring until the increase in the total silica content concentration stops.

As step 406, when the total silica content concentration is maintained after step 404, the control part considers that the amount of the agent used is insufficient and further adds the agent of the present embodiment. Step 406 may be skipped as appropriate.

As step 407, during cleaning, when the total silica content concentration increases only by the amount of the agent added even when the agent of the present embodiment is added, or when the upper limit value of the predetermined total silica content concentration is reached, the control part is executed to finish the cleaning. Step 407 may be skipped as appropriate.

Step 408 is finished when the total silica content concentration does not increase or when the predetermined upper limit value of the total silica content concentration is reached. After the finish or during the cleaning, all or a part of the cleaning solution having a high total silica content concentration is discharged out of the water system, and by replacing the cleaning solution in the water system with a new cleaning solution as appropriate, or by adding a new cleaning solution to the water system, the process may be restarted from step 401. Further, in Example 4, in order to determine the state or timing of discharge or liquid exchange of the cleaning solution, when the pH of the cleaning solution as in Example 3 drops below a predetermined value, a step in a case where the dissolved substance concentration in the cleaning solution as in Example 5 reaches the upper limit may be included.

In addition, Example 5 of the present embodiment will be described below.

It is suitable that Example 1 described above further include a step of measuring the dissolved substance concentration and a step of exchanging the liquid according to the dissolved substance concentration. Examples 1 to 4 described above can be adopted or integrated as appropriate. In addition, the step of adjusting the total silica content concentration and the step of adjusting the dissolved substance concentration may be carried out at the same time or by changing the order of the steps.

As step 501, the control part measures the dissolved substance concentration in the cleaning solution. The dissolved substance concentration may be an electric conductivity or a BRIX value.

As step 502, the control part performs liquid exchange with respect to all or a part of the cleaning solution when the upper limit of the predetermined solution concentration is reached, based on the measurement result of the dissolved substance in the cleaning solution. As liquid exchange, for example, all or part of the cleaning solution having a high dissolved substance concentration in the cleaning solution is discharged out of the water system, and the cleaning solution in the water system may be exchanged with a new cleaning solution as appropriate, or a new agent may be added to the water system. Accordingly, it is possible to reduce the dissolved substance concentration in the cleaning solution. After this, the process may be restarted from step 501, or the cleaning solution may be completely discharged to finish the cleaning.

5. Other Embodiments According to Disclosure

In the description of the cleaning method or the like according to the present embodiment, the description of each configuration or each treatment method, such as the silicic acid compound, the silica-based scale, the pH, the temperature, the total silica content concentration, the dissolved substance concentration, the used concentration, or the cleaning method, in the above-described "1." to "4.", will be omitted as appropriate. However, the description in "1." to "4.", and the like are also applied to the present embodiment and can be appropriately adopted. Further, in the description of an example of the solution treatment method in the present embodiment, the description which will be described later can be applied to the present embodiment, and can be appropriately adopted.

It is suitable that the cleaning management system according to the present embodiment include a cleaning management apparatus provided with at least the above-described control part. The cleaning management system of the present embodiment may further be provided with a communication part that can perform transmission and reception between the control part or the cleaning management apparatus including the control part and other parts or other apparatuses in a wireless and/or wired manner.

In addition, the method according to the present embodiment can also be realized by an apparatus including a CPU or a control part, in an apparatus (for example, computer, PLC, server, and cloud service) for managing the cleaning process status and the like. Further, the method according to the present embodiment can be stored as a program in a hardware resource including a recording medium (nonvolatile memory (USB memory and the like), HDD, CD, DVD, Blu-ray, and the like) and realized by the control part. It is also possible to provide an apparatus including the control part or the system, such as a cleaning status management system that controls the water system or the like to use a predetermined amount of the agent by the control part. Further, the management apparatus may include an input part such as a keyboard, a communication part such as a network, a display part such as a display, and the like.

Further, the cleaning management system and the like according to the present embodiment can be executed by using a program and hardware. One embodiment (not shown) of a computer 1 according to the embodiment of the disclosure is not limited thereto, and includes at least a CPU as a component of the computer 1, and may further include one or more selected from a RAM, a storage part, an output part, an input part, a communication part, a ROM, a measurement part, and the like. Of these, it is suitable to include a RAM, a storage part, an output part, and an input part, and further, it is suitable to include at least one of the communication unit, the measurement unit, the ROM, and the like. It is suitable that each component be connected by, for example, a bus as a data transmission path.

This technology can also adopt the following configurations.

[1] An agent containing a silicic acid compound. The agent is suitably a silica-based scale cleaning agent, a silica-based scale preventing agent, or a silica-based scale removing agent. Furthermore, the agent is an agent having low corrosiveness or low deterioration properties, and more suitably an agent having less corrosiveness or deterioration properties with respect to a metal or resin.

[2] The agent according to [1] above, used in a water treatment apparatus or a water system. The water system is suitably one or more selected from a water treatment system (for example, a membrane treatment system) and a circulating water system (for example, a cooling water system including a heat exchanger, a boiler water system, a scrubber water system, and a pulp process water system), and the water system is suitably water to be treated and/or circulating water.

[3] The agent according to [1] or [2] above, in which the cleaning agent has a pH of or more, or a water system using the cleaning agent is adjusted to have a pH of 10 or more.

[4] The agent according to any one of [1] to [3] above, in which the cleaning agent contains the silicic acid compound in an amount of 1,000 to 20,000 mg/L in terms of the total silica content, or the cleaning agent is used in a water system to obtain a concentration of 1,000 to 20,000 mg/L in terms of the total silica content.

[5] The agent according to any one of [1] to [4] above, in which the cleaning agent further contains one or more selected from a chelating agent, a surfactant, and a dispersant. Suitably, the agent is a solid or solution agent.

[6] The agent according to any one of [1] to [5] above, in which the cleaning agent further contains percarbonate, or is used in combination with a solid agent containing percarbonate when used. More suitably, the agent may be a multi-dosage form agent kit made up of a first agent containing a silicic acid compound and a second agent containing percarbonate, and the more suitable second agent may be either liquid or solid as long as foam can be formed.

[7] The agent according to any one of [1] to [6] above, in which the cleaning agent is used at a water temperature of 10° C. or higher in the water system.

[8] A cleaning method of a water treatment apparatus, including: using a solution containing a silica-based scale cleaning agent that contains a silicic acid compound, or using a solution containing a silicic acid compound. The water treatment apparatus is suitably a prefilter treatment apparatus and/or a reverse osmosis membrane treatment apparatus.

[9] The cleaning method of a water treatment apparatus according to [8] above, in which the solution is adjusted to have a pH of 10 or more.

[10] The cleaning method of a water treatment apparatus according to [8] or [9] above, in which the solution contains the silicic acid compound in an amount of 1,000 to 20,000 mg/L in terms of the total silica content, or the solution is added to water to be treated in the water treatment apparatus to adjust the water to be treated to have a concentration of 1,000 to 20,000 mg/L in terms of the total silica content.

[11] The cleaning method of a water treatment apparatus according to any one of [8] to [10] above, in which the temperature of the solution is 10° C. or higher. The configurations described in [1] to [10] above may be appropriately adopted.

[12] The cleaning method of a water treatment apparatus according to any one of [8] to [11] above, in which the solution further contains percarbonate, or further contains a solid agent containing percarbonate when used.

[13] The cleaning method of a water treatment apparatus according to any one of [8] to [12] above, in which the solution further contains one or more selected from a chelating agent, a surfactant, and a dispersant.

[14] The cleaning method of a water treatment apparatus according to any one of [8] to [13] above, in which the cleaning method is for cleaning of a silica-based scale.

[15] A cleaning method of a silica-based scale, including: using an agent containing a silicic acid compound for a water system.

[16] The cleaning method of a silica-based scale according to [15] above, in which the water system is adjusted to have a pH of 10 or more and a temperature of 10° C. or higher.

[17] The cleaning method of a silica-based scale according to [15] or [16] above, in which the water system is suitably water to be treated or circulating water, and more suitably water to be treated in a water treatment system (membrane treatment system) or circulating water in a circulating water system (a cooling water system or a boiler water system including a heat exchanger, a scrubber water system, and the like).

[18] The cleaning method of a silica-based scale according to any one of [15] to [17] above, in which the total silica content concentration in the water system is adjusted to a predetermined concentration. The suitable predetermined concentration is 1,000 to 20,000 mg/L in terms of the total silica content.

[19] The cleaning method of a water treatment apparatus according to any one of the [8] to [14] above, or the cleaning method of a silica-based scale according to any one of [15] to [18], the method including using the agent according to any one of [1] to [7] above.

[20] A silicic acid compound or use thereof, for use in an agent or for cleaning silica-based scale, preventing silica-based scale, and removing silica-based scale.

[21] The silicic acid compound according to [20] above, in which the agent has a pH of 10 or more, or is used to adjust the water system using the agent to have a pH of 10 or more.

[22] The silicic acid compound according to any one of [19] to [21] above, in which the agent contains the silicic acid compound in an amount of 1,000 to 20,000 mg/L in terms of the total silica content, or the agent is used in a water system to obtain a concentration of 1,000 to 20,000 mg/L in terms of the total silica content.

[23] The silicic acid compound according to [20] to [22] above, in which the silicic acid compound further uses one or more selected from a chelating agent, a surfactant, and a dispersant in combination. In addition, the silicic acid compound is suitably used in combination with a solid agent containing percarbonate when used. The respective components may be in a unit package form separately or together.

[24] A silicic acid compound or use thereof, for producing an agent or for use in producing an agent. Use of the silicic acid compound in the agent. The agent is suitably a silica-based scale cleaning agent, a silica-based scale preventing agent, or a silica-based scale removing agent. Furthermore, the agent is an agent having low corrosiveness or low deterioration properties, and more suitably an agent having less corrosiveness or deterioration properties with respect to a metal or resin.

[25] An agent kit including a first agent containing a silicic acid compound; and a solid second agent containing percarbonate. The powdered second agent is suitably used in combination when used in a water system. The agent kit may be an agent kit which is a multi-dosage form agent, may be an agent which is mixed at the time of use and containing the first agent and the second agent, or may be mixed as a separate agent into the treatment target. For example, it is more suitable to add the second agent to the treatment target at the same time as or at a different time from the addition of the first agent to the treatment target. Each of the first and second agents may be a one-dosage form agent in a unit package form, which is integrated or in one package.

[26] The suitable agent kit according to [25] above is suitably a silica-based scale cleaning agent kit, a silica-based scale preventing agent kit, or a silica-based scale removing agent kit. Furthermore, the agent kit is an agent having low corrosiveness or low deterioration properties when the first agent and the second agent are mixed and used, and more suitably, the agent kit is an agent having less corrosiveness or deterioration properties with respect to a metal or resin.

[27] The first agent according to [25] or [26] above may further contain one or more selected from a chelating agent, a surfactant, and a dispersant, each agent may be used being contained in a third agent, a fourth agent, and a fifth agent, separately. In addition, first, second, and . . . are numbers given for convenience, and are not particularly limited to number, order, and the like.

[28] A cleaning method of a silica-based scale, including a process of adjusting the total silica content concentration of the water system. A cleaning method of a silica-based scale, including a process of adjusting the total silica content concentration of the water system and a discharge or liquid exchange process of discharging or liquid-exchanging a part or all of the water system. In the discharge or liquid exchange process, a part or all of the water system is suitably discharged based on the measurement result of one or more selected from the total silica content concentration, the pH, and the dissolved substance concentration.

EXAMPLES

Embodiments of the disclosure will be described with reference to the following examples and comparative examples. The scope of the disclosure is not limited to the examples.

Example 1

In a representative water treatment apparatus, that is, a water treatment apparatus having an RO membrane on which easily scale mainly made up of silica is easily generated due to the increase in the concentration of silica, a cleaning test using an inorganic scale mainly made up of actually generated silica was carried out.

Table 1 shows the results of disassembling and scale-analyzing the membranes of the samples of the two equipment in which clogging due to the silica occurred.

After measuring the dry weight (105° C.) of the collected samples, the loss on ignition was measured at 600±25° C. The samples after measuring weight loss were heated and dissolved with a strong acid, and the weight of the dissolved residue was measured. Then, each ion concentration of the dissolved substances of the samples was quantified by using ICP emission analysis, and then converted into an oxide form. Separately, the inorganic carbon of the sample after the dry weight measurement was measured by total organic carbon (TOC).

TABLE 1

Scale analysis results for each sample

| Item | Equipment 1 (Sample 1) | Equipment 2 (Sample 2) |
|---|---|---|
| Appearance | Light gray brown | Gray brown |
| Calcium oxide (CaO) | Trace | 2.5 |
| Magnesium oxide (MgO) | Trace | 0.8 |
| Iron oxide (Fe2O3) | 1.7 | 23.8 |
| Copper oxide (CuO) | Trace | Trace |
| Zinc oxide (ZnO) | Trace | Trace |
| Manganese oxide (MnO) | 0.9 | 0.9 |
| Aluminum oxide (Al2O3) | Trace | Trace |
| Acid-insoluble content (SiO2) | 93.2 | 56.5 |
| Sulfur trioxide (SO3) | 2.4 | 2.4 |
| Phosphorus pentoxide (P2O5) | 4.8 | 4.8 |
| Carbon dioxide (CO2) | Trace | Trace |
| Loss on ignition | Trace | Trace |

* The unit is % by weight.

Experimental Conditions

1. Cleaning Test 1-1. Comparative Test Using Flat Membrane

For each sample, the cleaning agent was evaluated using a flat membrane prepared by disassembling the actual RO membrane.

When dirt or scale is adhered to the RO membrane, there is a large influence on the permeability and salt removability of the membrane, and thus it is easy to understand the change in scale removability.

The cleaning test was conducted under the following conditions.

Figure 2:
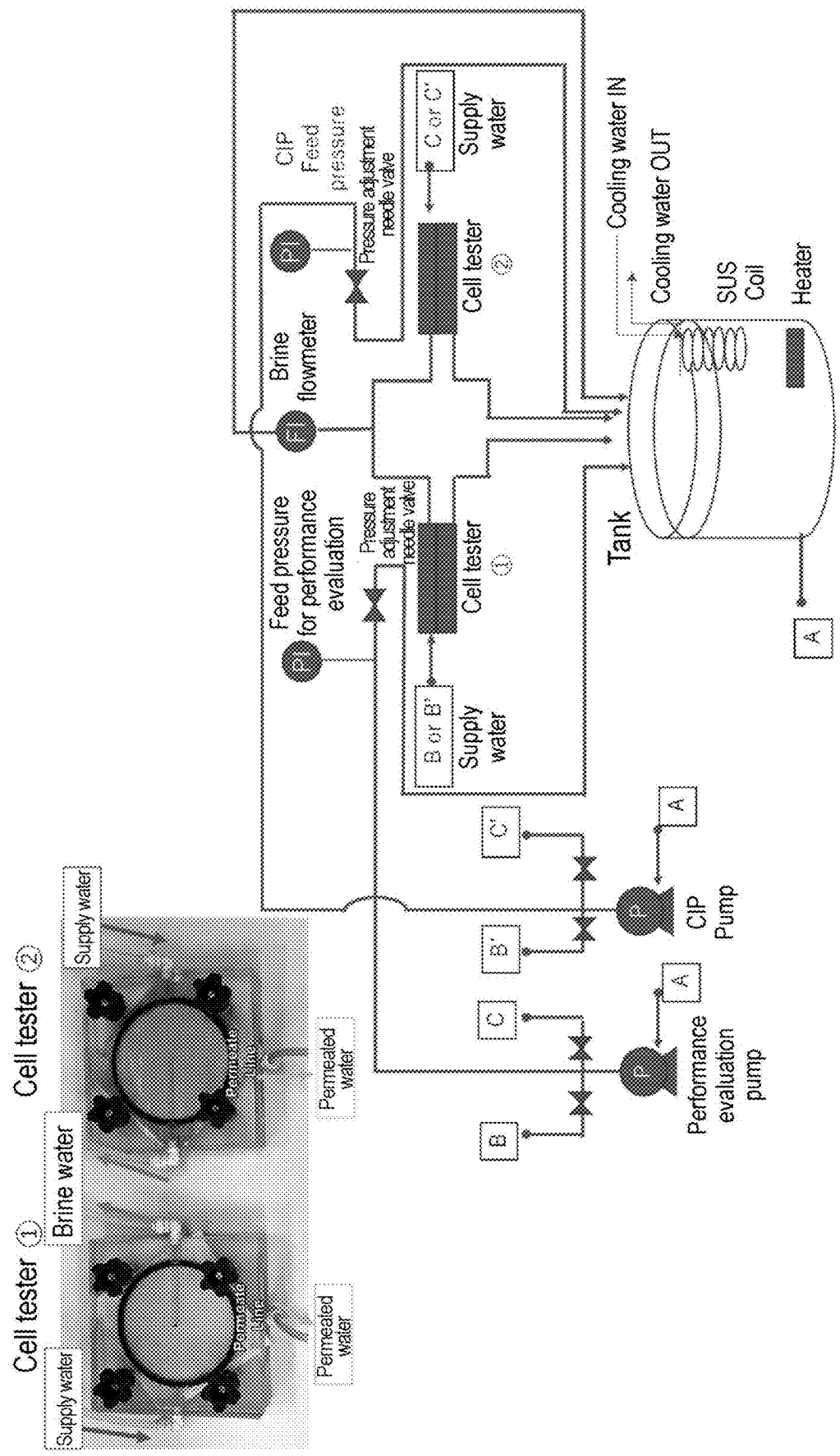
FIG. 2 is a schematic view illustrating an RO flat membrane evaluation apparatus.

For the flat membrane, the performance measurement (permeation flow rate, salt removal rate) and the cleaning test were carried out with respect to the RO membrane (TMG20-400 manufactured by Toray Industries, Inc., low pressure membrane, crosslinked total aromatic polyamide-based composite membrane) using the cell of FIG. 1, which can measure the performance in the flat membrane state. [Conditions for performance evaluation], [Operating conditions during cleaning], and [Table 2] are shown below as the conditions. The evaluation part of the RO membrane is approximately 10 cm in diameter at the inner part of the O-ring. In addition, the cells (cell testers 1 and 2) in which the RO membrane was set were set in the circulation system apparatus, and the cleaning solution was circulated using the performance evaluation pump and the CIP (cleaning in place) pump to clean the RO membrane (refer to FIG. 2). The stored water in the tank was adjusted to the cleaning solution shown in Table 2 and circulated, and the stored water in the tank was appropriately collected and analyzed for water quality.

Disclosure 3 and Disclosure 4 can be obtained by further incorporating 1% of the dispersant (polyacrylic acid, weight average molecular weight of approximately 4,000) into Disclosure 1 and Disclosure 2 as cleaning solutions, respectively. Disclosure 3 and Disclosure 4 will be able to exhibit the same or better cleaning effect in comparison with Disclosure 1 and Disclosure 2, respectively. Further, the anionic surfactant of Disclosure 2 can be replaced with a nonionic surfactant to prepare a cleaning solution, and the cleaning solution can be added to an apparatus having a circulating water mechanism to clean the inside of the circulation flow path. It is possible to pack the first agent containing sodium metasilicate powder and the second agent containing sodium percarbonate powder with a water-soluble resin, respectively, and fix the first and second agents on a water-soluble resin sheet to produce an integrated unit packaging form. By adding the first and second agents to a water system, each of these is dissolved to prepare a cleaning solution, and each cleaning action can be exhibited better.

The evaluation items (Nor. Flux (m/d), Rejection (%)) in Table 3 were determined according to Non-Patent Document 1: FilmTec™ Reverse Osmosis Membranes Technical Manual Version 4, October 2020, DuPont de Nemours, Inc., P138-142, "5.6.6 Plant Performance Normalization". The pH, the conductivity (mS/m), the iron, the ionic silica (mg/L), and the total silica (mg/L) in Table 6 were measured by a pH meter (glass electrode) for pH, an electric conductivity meter (electrode type) for conductivity (mS/m), an ICP emission analysis for iron, an analysis method specified in JIS K 0101 44.3 for total silica, and an analysis method specified in JIS K 0101 44.3 for ionic silica, respectively.

[Conditions for Performance Evaluation]

Pressure: 0.69 MPa

Flow rate: 2.8 L/min

Water temperature: 25° C.

Solution: NaCl 500 mg/L

[Operating Conditions During Cleaning]

Pressure: 0.1 to 0.2 MPa

Flow rate: 3.2 to 3.4 L/min

Water temperature: 35° C.

Cleaning time: 6 hours of circulation+overnight immersion+1 hour of circulation

TABLE 2

Composition of cleaning solution

| | Formulation | pH (20°) |
|---|---|---|
| Disclosure 1 | Sodium metasilicate (anhydrous) 1% | 12.5 to 13.0 |
| Disclosure 2 | Sodium metasilicate (anhydrous) 1% EDTA-4Na 100 mg/L Anionic surfactant 100 mg/L Sodium percarbonate 3000 mg/L | 12.5 to 13.0 |
| Conventional Cleaning 1 | NaOH | 12.5 to 13.0 |
| Conventional Cleaning 2 | NaOH EDTA-4Na 100 mg/L Anionic surfactant 100 mg/L | 12.5 to 13.0 |

1-2. Cleaning Test Using Membrane Module

A cleaning test was carried out using Disclosure 2 with respect to the membrane module extracted from the same equipment as Sample 2.

[Conditions for Performance Evaluation]

Pressure: 0.76 MPa

Water supply flow rate: approximately 5 m$^3$/h, recovery rate 15%

Water temperature: 25° C.

Solution: NaCl 500 mg/L

[Operating Conditions During Cleaning]

Pressure: 0.1 to 1.0 MPa

Flow rate: 9 to 10 m$^3$/h

Water temperature: 35° C.

Cleaning time: 6 hours (h) circulation+overnight immersion+1 hour (h) of circulation 1-3. Corrosion Resistance Test A solution having a concentration 6 times that of Disclosure 2 was prepared, and a corrosion resistance evaluation test of the material was carried out.

For the test piece, each material having a size of 30 mm×50 mm×1 to 3 mm is used, and the solution is placed such that approximately half of the test piece is immersed, covered with a wrap to prevent evaporation of the solution, and left in a thermostatic chamber at 40° C.

After being left for 14 days, the corrosion resistance is evaluated from the appearance, size, weight, and the like of the test piece.

RESULTS AND DISCUSSION

1. Cleaning Test 1-1. Comparative Test Results Using Flat Membrane

As shown in Tables 3 to 5, as compared with the cleaning test in which the pH was adjusted to the same as that of the developed product and the cleaning test in which a chelating agent or a surfactant was incorporated, by using NaOH in the conventional cleaning, the cleaning agent according to the disclosure was used, and accordingly, it was confirmed that the performance of the RO membrane was greatly improved. It was also confirmed that the effect was further enhanced by using sodium percarbonate in combination in the disclosure.

Comparing the properties of the scale that still remained after cleaning, it was confirmed that the properties of the scale were clearly altered by the cleaning of the disclosure as shown in Table 5, and it was possible to remove the scale from the membrane surface with a small force.

Although the principle of the effect of this disclosure is not clear, it is considered that the silica in sodium metasilicate softens the scale not only because the silica-based scale partially dissolves but also the cleaning solution permeates thereinto.

It is considered that sodium percarbonate was effective in promoting the removal of such silica-based scale, and that the peeling effect was enhanced because oxygen bubbles generated by the decomposition of percarbonate were generated in the cleaning solution that permeated into the scale under high alkaline conditions.

TABLE 3

Membrane performance measurement results before and after cleaning each sample

| | Test | | | | | | | |
|---|---|---|---|---|---|---|---|---|
| | Sample 1: Cleaning test | | | | Sample 2: Cleaning test | | | |
| | At the time of measurement | | | | | | | |
| | Before cleaning | | After cleaning | | Before cleaning | | After cleaning | |
| Evaluation item | Nor. Flux (m/d) | Rejection (%) | Nor. Flux (m/d) | Rejection (%) | Nor. Flux (m/d) | Rejection (%) | Nor. Flux (m/d) | Rejection (%) |
| Disclosure 1 | 0.576 | 28.9 | 1.48 | 84.8 | 0.067 | 20.1 | 1.98 | 92.5 |
| Disclosure 2 | 0.521 | 41.1 | 1.52 | 88.4 | 0.088 | 22.3 | 2.12 | 94.1 |
| Conventional Cleaning 1 | 0.451 | 33.9 | 0.736 | 72.0 | 0.075 | 18.0 | 0.763 | 83.7 |
| Conventional Cleaning 2 | 0.422 | 39.4 | 1.27 | 80.9 | 0.038 | 16.7 | 1.38 | 90.2 |

TABLE 4

Membrane performance measurement results before and after cleaning each sample

| | Test | | | |
|---|---|---|---|---|
| | Sample 1: Cleaning test | | Sample 2: Cleaning test | |
| | At the time of photographing | | | |
| | Before cleaning | After cleaning | Before cleaning | After cleaning |
| Disclosure 1 | Refer to [FIG. 3A]. The entire membrane is covered with a gray scale. | Refer to [FIG. 3B]. A light gray part remains near the center of the membrane, but the white membrane surface can be seen at the most part. | Refer to [FIG. 3C]. The entire film is ocher. | Refer to [FIG. 3D]. There is a slightly light yellow color at the upper part of the membrane, but other parts are white. White membrane surface can be seen on the entire membrane compared to a state before cleaning. |
| Disclosure 2 | Refer to [FIG. 3E]. The entire membrane is covered with a gray scale. | Refer to [FIG. 3F]. An island-like light gray part remains on the entire membrane, but the white surface of the membrane can be seen at more parts than before cleaning. | Refer to [FIG. 3G]. The entire membrane is light ocher. | Refer to [FIG. 3H]. There is a slightly yellow scale at the lower right part of the membrane, but other parts are white. White membrane surface can be seen on the entire membrane compared to a state before cleaning. |
| Conventional Cleaning 1 | — (No photographic data) | Refer to [FIG. 3I]. The entire membrane is covered with a gray scale. | Refer to [FIG. 3J]. The entire film is ocher. | Refer to [FIG. 3K]. The entire membrane is not much different from the one before cleaning, and the brown color is slightly stronger. |
| Conventional Cleaning 2 | Refer to [FIG. 3L]. The entire membrane is covered with a gray scale. | Refer to [FIG. 3M]. The entire membrane is gray. The gray color is lighter than before cleaning a part of the membrane, and the membrane surface can be seen. | Refer to [FIG. 3N]. The entire film is ocher. | Refer to [FIG. 3O]. The entire membrane is light yellow. The ocher color is slightly lighter than before cleaning. |

TABLE 5

Properties of residual scale after cleaning Sample 2

Figure 4A:
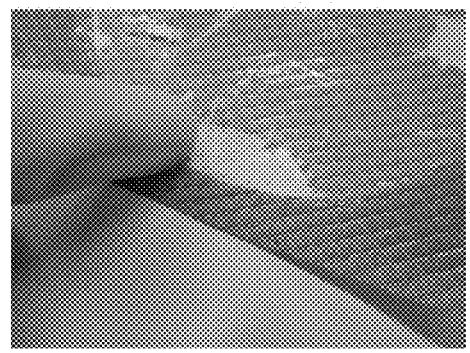
FIGS. 4A to AD are photographic images illustrating properties of the residual scale after cleaning Sample 2 in the cleaning tests of Disclosure 1 and 2 and cleaning tests of Conventional Cleaning 1 and 2.
Figure 4B:
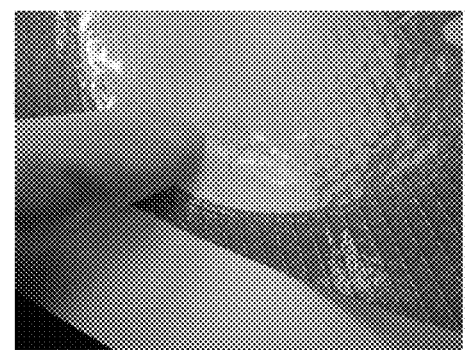
FIG. 4B is a photographic image illustrating the properties of the residual scale after cleaning Sample 2 in Disclosure 2.

| | Appearance when tracing the membrane surface with a finger | Properties of scale |
|---|---|---|
| Disclosure 1 | Refer to [FIG. 4A]. | The scale was easily peeled off from the membrane surface by simply moving the finger so as to gently stroke, and the RO membrane surface could be observed. |
| Disclosure 2 | Refer to [FIG. 4B]. | The scale was easily peeled off from the membrane surface by simply moving the finger so as to gently stroke, and the RO membrane surface could be observed. |

TABLE 5-continued

Properties of residual scale after cleaning Sample 2

Figure 4C:
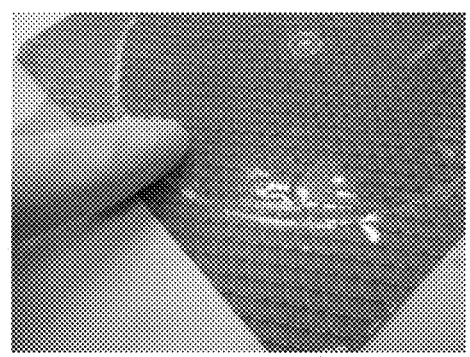
FIG. 4C is a photographic image illustrating the properties of the residual scale after cleaning Sample 2 in Conventional Cleaning 1.
Figure 4D:
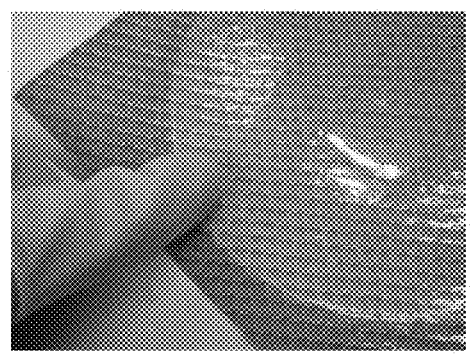
FIG. 4D is a photographic image illustrating the properties of the residual scale after cleaning Sample 2 in Conventional Cleaning 2.

| | Appearance when tracing the membrane surface with a finger | Properties of scale |
|---|---|---|
| Conventional Cleaning 1 | Refer to [FIG. 4C]. | The scale was firmly adhered and could not be peeled off from the membrane surface even when the surface was rubbed strongly. |
| Conventional Cleaning 2 | Refer to [FIG. 4D]. | The scale was firmly adhered and could not be peeled off from the membrane surface even when the surface was rubbed strongly. |

1-2. Cleaning Test Results Using Membrane Module

Table 6 summarizes the performance of the modules before and after cleaning.

After cleaning, the performance was significantly improved as in the flat membrane test using Sample 2.

Table 7 shows the results of sampling and analysis for each elapsed time during module cleaning.

From the results, it was found that the silica concentration in the cleaning solution gradually increased, and it was confirmed that the silica was dissolved by the cleaning agent.

TABLE 6

Performance of membrane module before and after cleaning

Test
Field 2: Module cleaning test
At the time of measurement

| | Before cleaning | | | After cleaning | | |
|---|---|---|---|---|---|---|
| Evaluation item | dP (kPa) | Nor. Flux ($m^3$/h) | Rejection (%) | dP (kPa) | Nor. Flux ($m^3$/h) | Rejection (%) |
| Disclosure 1 | 12 | 0.72 | 93.9 | 9 | 1.63 | 97.2 |

TABLE 7

Changes in water quality during RO membrane module cleaning

| Analysis item | After 10 minutes of circulation | After 1 hour of circulation | After 2 hours of circulation | After 3 hours of circulation | After 4 hours of circulation | After 6 hours of circulation | 6 hours of circulation → overnight immersion → after 1 hour of recirculation |
|---|---|---|---|---|---|---|---|
| pH (20° C.) | 12.9 | 12.8 | 12.7 | 12.7 | 12.7 | 12.6 | 12.6 |
| Conductivity (mS/m) | 2,210 | 2,140 | 2,020 | 1,830 | 1,740 | 1,640 | 1,570 |
| Iron (mg/L) | 24.6 | 27.9 | 32 | 39.9 | 44.4 | 50.1 | 52.7 |
| Ionic silica (mg/L) | 5,240 | 5,240 | 5,680 | 6,610 | 7,380 | 7,590 | 8,200 |
| Total silica (mg/L) | 5,570 | 5,520 | 5,680 | 6,670 | 7,380 | 7,870 | 8,200 |

1-3. Corrosion Resistance Test Results

The results of SUS304, SUS316, SS400 (carbon steel), Hastelloy C, PVDF, PVC, PE, PP, and acryl are shown.

From Tables 8 and 9 below, it is shown that, with respect to various materials, cleaning agents are less corrosive to materials generally used in water treatment equipment and can be widely used.

It was known that PVDF showed a decrease in strength when immersed in alkaline conditions, but it was determined that there was no problem in applying a cleaning agent to PVDF.

TABLE 8

| Name of test piece | Weight before test (g) | Weight after test (g) | Corrosion weight loss (mg) |
|---|---|---|---|
| SUS304 | 11.3464 | 11.3455 | 0.9 |
| SUS316 | 10.5622 | 10.5614 | 0.8 |
| SS400 | 23.1624 | 23.1616 | 0.8 |
| Hastelloy C | 26.0091 | 26.0089 | 0.2 |

TABLE 9

Corrosion resistance test results (resin material)

| Material | Condition | Short side (mm) | Long side (mm) | Thickness a (mm) | Thickness b (mm) | Thickness c (mm) |
|---|---|---|---|---|---|---|
| PVDF | Before the test | 29.75 | 49.65 | 2.08 | 2.08 | 2.09 |
|  | After the test | 29.73 | 49.66 | 2.09 | 2.09 | 2.09 |
| PVC | Before the test | 29.87 | 49.74 | 2.07 | 2.06 | 2.07 |
|  | After the test | 29.88 | 49.76 | 2.07 | 2.07 | 2.08 |
| PE | Before the test | 29.89 | 49.69 | 2.1 | 2.1 | 2.09 |
|  | After the test | 29.87 | 49.7 | 2.1 | 2.1 | 2.1 |
| PP | Before the test | 30.05 | 49.79 | 2.07 | 2.07 | 2.06 |
|  | After the test | 30.04 | 49.8 | 2.08 | 2.08 | 2.07 |
| Acryl | Before the test | 30.02 | 49.92 | 2.01 | 2.02 | 2.01 |
|  | After the test | 30.11 | 50.07 | 2.03 | 2.04 | 2.04 |

What is claimed is:

1. A cleaning method of a water treatment apparatus for removing a silica-based scale in a water system, comprising:
   using a solution containing a silica-based scale cleaning agent that contains a silicic acid compound, or
   using a solution containing a silicic acid compound,
   wherein the solution is adjusted to have a pH of 10 or more, and
   the solution contains the silicic acid compound in an amount of 1,000 to 20,000 mg/L in terms of the total silica content, or the solution is added to water to be treated in the water treatment apparatus to adjust the water to be treated to have a concentration of 1,000 to 20,000 mg/L in terms of the total silica content, and
   the solution is adjusted to have a temperature of 50° C. or lower.

2. The cleaning method of a water treatment apparatus for removing the silica-based scale in the water system according to claim 1, wherein
   the solution further contains a solid agent containing percarbonate.

3. The cleaning method of a water treatment apparatus for removing the silica-based scale in the water system according to claim 1, wherein
   the solution further contains one or more selected from a chelating agent, a surfactant, and a dispersant.

4. A cleaning method of a silica-based scale, comprising:
   using an agent containing a silicic acid compound in a water system, and the agent containing the silicic acid compound is a solution,
   wherein the water system is adjusted to have a pH of 10 or more, and
   the agent contains the silicic acid compound in an amount of 1,000 to 20,000 mg/L in terms of the total silica content, or the agent is added to water to be treated in the water system to adjust the water to be treated to have a concentration of 1,000 to 20,000 mg/L in terms of the total silica content, and
   the solution is adjusted to have a temperature of 50° C. or lower.

5. The cleaning method of a water treatment apparatus for removing the silica-based scale in the water system according to claim 1, wherein
   the cleaning agent contains the silicic acid compound in an amount of 3,000 to 10,000 mg/L in terms of the total silica content, or
   the cleaning agent is used in a water system to obtain a concentration of 3,000 to 10,000 mg/L in terms of the total silica content.

6. The cleaning method of a water treatment apparatus for removing the silica-based scale in the water system according to claim 1, wherein
   the water treatment apparatus is a water treatment apparatus provided with a membrane treatment apparatus.

7. The cleaning method of a water treatment apparatus for removing the silica-based scale in the water system according to claim 1, wherein
   the silicic acid compound is metasilicic acid or a salt.

8. The cleaning method of a water treatment apparatus for removing the silica-based scale in the water system according to claim 2, wherein
   the silicic acid compound is metasilicic acid or a salt.

9. The cleaning method of a water treatment apparatus for removing the silica-based scale in the water system according to claim 1, wherein
   the solution contains a chelating agent having a concentration of 0 to 10,000 mg/L.

10. The cleaning method of a silica-based scale according to claim 4, wherein
    the water system contains a chelating agent having a concentration of 0 to 10,000 mg/L.

\* \* \* \* \*